United States Patent [19]

Brun et al.

[11] Patent Number: 5,562,757
[45] Date of Patent: Oct. 8, 1996

[54] DEVICE FOR RECOVERING THE VAPORS LEAVING A MOTOR VEHICLE GASOLINE TANK

[75] Inventors: Francois Brun, Toulouse; Francis Tarroux, Pinsaguel, both of France

[73] Assignee: Siemens Automotive S.A., Toulouse Cedex, France

[21] Appl. No.: 302,927

[22] PCT Filed: Jan. 10, 1994

[86] PCT No.: PCT/EP94/00043

§ 371 Date: Nov. 2, 1994

§ 102(e) Date: Nov. 2, 1994

[87] PCT Pub. No.: WO94/16915

PCT Pub. Date: Aug. 4, 1994

[30] Foreign Application Priority Data

Jan. 19, 1993 [FR] France .................................. 93 00570

[51] Int. Cl.⁶ .................................................. F02M 33/00
[52] U.S. Cl. ............................. 96/113; 55/385.3; 95/021; 95/146; 96/114; 96/144; 96/147; 123/519; 123/520
[58] Field of Search ..................... 95/143, 146, 19, 95/22, 21; 55/385.3; 96/113, 114, 144, 115, 142, 147, 136; 123/518, 519, 520

[56] References Cited

U.S. PATENT DOCUMENTS

| 3,221,724 | 12/1965 | Wentworth | 96/136 |
| 3,368,326 | 2/1968 | Hervert | 96/136 |
| 3,460,522 | 8/1969 | Kittler et al. | 96/113 |
| 4,702,216 | 10/1987 | Haruta et al. | 123/519 |
| 5,172,672 | 12/1992 | Harada | 123/519 |
| 5,183,023 | 2/1993 | Hanson | 123/519 |
| 5,193,512 | 3/1993 | Steinbrenner et al. | 123/519 |
| 5,347,971 | 9/1994 | Kobayashi et al. | 123/520 |

FOREIGN PATENT DOCUMENTS

| 2635823 | 3/1990 | France . | |
| 4003751 | 8/1991 | Germany . | |
| 4-354255 | 12/1992 | Japan | 123/519 |
| 5-195882 | 8/1993 | Japan | 123/519 |
| 6-42415 | 2/1994 | Japan | 123/519 |

*Primary Examiner*—Jay H. Woo
*Assistant Examiner*—Duane S. Smith
*Attorney, Agent, or Firm*—Herbert L. Lerner; Laurence A. Greenberg

[57] ABSTRACT

Fuel vapors leaving the fuel tank of a motor vehicle are recovered with a filter cartridge inserted between the tank and the intake manifold of the engine. An atmospheric connection duct of the cartridge can be selectively connected to the intake partial vacuum with a pneumatic distributor. The leaktightness of the device is thereby tested.

9 Claims, 1 Drawing Sheet

5,562,757

DEVICE FOR RECOVERING THE VAPORS LEAVING A MOTOR VEHICLE GASOLINE TANK

BACKGROUND OF THE INVENTION

1. Field of the Invention

The present invention relates to a device for recovering the vapors leaving a fuel tank of a motor vehicle driven by an internal combustion engine and, more particularly, to such a device designed to allow its leaktightness to be tested.

Current motor vehicles are commonly equipped with devices capable of providing the fuel vapors generated in the tank from being released into the atmosphere, in order to limit the pollution thereof with hydrocarbons. For this purpose, a filter cartridge is used which is connected to the fuel tank in which the hydrocarbons contained in the vapors leaving the fuel tank are separated from the air by one or more layers of active charcoal. In order to prevent saturation of this filter cartridge, it is regenerated using periodic flushing with atmospheric air sucked into the cartridge through an atmospheric connection orifice under the effect of a partial vacuum applied to a third orifice connected to the intake manifold of the internal combustion engine via a purge control solenoid valve.

Certain regulations, and in particular those of the Californian Air Rescue Board (CARB) stipulate that the operation of such a device .shall be capable of being tested in order for a deficiency such as, for example, a leaktightness defect of the device, to be signaled to the driver of the vehicle.

2. Description of the Related Art

A device is known from the prior art, for example from French Patent 2,635,823, for recovering the fuel vapors, which device consists of a fuel tank, a filter cartridge connected by a first duct to said tank and by a second duct to a purge solenoid valve connecting the cartridge with the partial vacuum which prevails in the intake manifold of the engine, in which the absence leaks in the circuit is diagnosed by measuring the partial vacuum which is set up in the tank during a purge phase. From German Patent DE 40-03-751, such a device is also known in which the filter cartridge is fitted, on its atmospheric connection orifice, with a blocking solenoid valve making it possible to isolate the device from the surrounding air in order to diagnose even smaller leaks. However, such devices have the drawback, during a leaktightness test of the circuit, of introducing into the intake manifold of the engine a mixture of fuel vapors which can seriously disturb the operation of devices for controlling the richness of the air/fuel mixture supplied to the engine. In fact, the introduction of vapors heavily loaded with fuel, as is the case when the cartridge is close to saturation, increases the fuel richness of the mixture introduced into the combustion chamber and then leads either to an excess pollution or, in the case of feed systems in closed loop with respect to the richness of the mixture, to a significant reduction in the quantity of fuel injected. In this case, at the end of the test, removal of this addition of vapors leads to a mixture which is too lean in fuel, which may cause combustion misfires and engine knocking which are prejudicial to driving.

The object of the present invention is therefore to provide a device for recovering fuel vapors which makes it possible to carry out a leaktightness test of the device, without having the drawbacks of the prior art.

SUMMARY OF THE INVENTION

These objects of the invention, as well as others which will emerge in the rest of the present description, are achieved with a device for recovering vapors leaving the fuel tank of a motor vehicle, comprising in particular a cartridge for recovery of the vapors by absorbtion, including a purge orifice, an inlet orifice connected to the fuel tank and an atmospheric connection orifice for discharging the filtered vapors to the atmosphere, and a control solenoid valve for purging the cartridge, connected by a first orifice to the intake manifold of an internal combustion engine, and by a second orifice to the purge orifice of the cartridge via a purge duct.

According to the invention, this device comprises means allowing the atmospheric connection orifice of the cartridge to be connected selectively to the atmosphere or to the second orifice of the purge solenoid valve in order to set up a controlled partial vacuum in the device without disturbing the regulation of the air/fuel mixture supplied to the engine.

According to a first embodiment of the present invention, the means making it possible selectively to connect the atmospheric connection orifice of the cartridge to the atmosphere or to the second orifice of the purge solenoid valve consist of a three-way pneumatic distributor.

According to a second embodiment of the present invention, the means making it possible selectively to connect the atmospheric connection orifice of the cartridge to the atmosphere or to the second orifice of the purge solenoid valve consist of a four-way pneumatic distributor simultaneously connecting the second orifice of the purge solenoid valve to the purge orifice of the cartridge and the atmospheric connection orifice to the atmosphere, in the rest position, or connecting said second orifice to the atmospheric connection orifice and simultaneously closing the duct connected to the purge orifice of the cartridge in the working position, respectively.

Other features and advantages of the circuit according to the invention will emerge on reading the following description and inspecting the attached drawing, in which:

DESCRIPTION OF THE PREFERRED EMBODIMENTS

Figure 1:
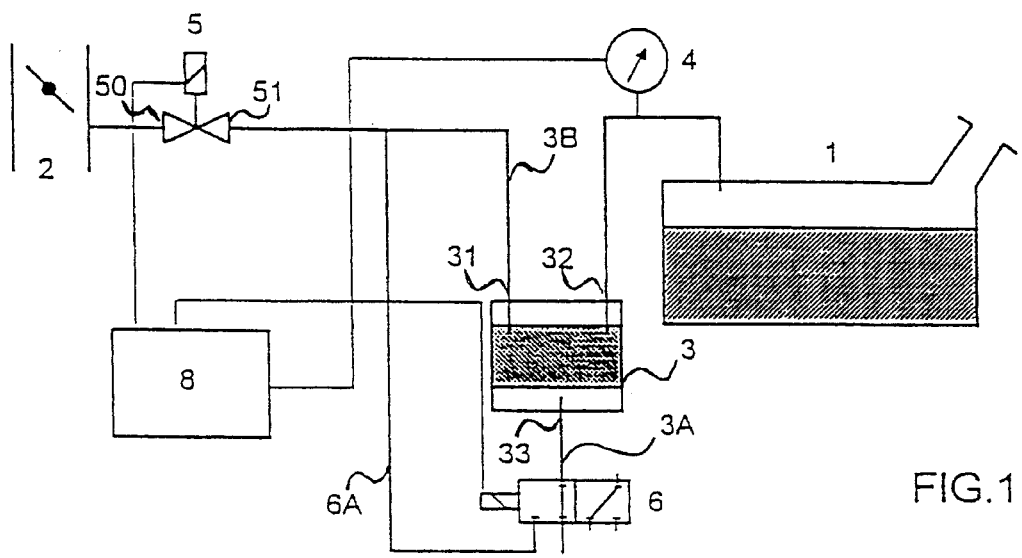
FIG. 1 represents a diagram of a first embodiment of the device according to the invention.

Reference is made to FIG. 1, which shows a fuel tank 1 connected to a filter cartridge 3 by a duct ending in an inlet orifice 32 of the cartridge. A pressure sensor 4 is connected onto this duct between the tank and the cartridge. The purge orifice 31 of the cartridge is connected to an orifice 51 of a purge solenoid valve 5 via a duct 3B. The second orifice 50 of the solenoid valve 5 is connected to the intake manifold 2 of an internal combustion engine, not shown. The atmospheric connection orifice 33 of the cartridge is connected via a duct 3A to a first orifice of a three-way, two-position distributor 6. In the resting position, the distributor 6 establishes a connection between this first orifice and a second orifice which is open to the surrounding atmosphere, while closing the third orifice. This third orifice is connected via a duct 6A to the duct 3B at a point located between the purge orifice 31 of the cartridge and the orifice 51 of the purge solenoid valve 5. The control solenoids of the solenoid valve 5 and of the distributor 6 are electrically connected to a control computer 8 designed to supply them with suitable commutation control signals. The control computer 8 is also connected to the pressure sensor 4 by an electrical link which allows it to receive the value of the pressure measured by the sensor.

In the initial state of the device, the solenoid valve 5 is closed and the distributor 6 is in its rest position. When a leaktightness test of the device is to be carried out, the computer 8 orders the distributor 6 to pass from the rest position to the working position, thus connecting the atmospheric connection orifice 33 of the cartridge, via the ducts 3A and 6A, to the duct 3B. The computer 8 then causes the purge solenoid valve 5 to open, thus allowing the partial vacuum which prevails in the intake manifold 2 of the engine to be propagated into the cartridge 3 and into the tank 1. This partial vacuum is then measured by the sensor 4 which informs the computer 8 of its value. When this Value reaches or exceeds a predetermined value, the computer 8 closes the solenoid valve 5, thus isolating the whole of the device both from the partial-vacuum source and from the atmospheric pressure. It is then sufficient, as is known from the state of the art, to monitor the change in the pressure within the device as a function of time, for example, in order to be able to diagnose a possible leak of the device.

It will noted that, when the partial vacuum is set up in the device, the gases drained to the intake manifold 2 come in substantially equal quantities from the purge orifice 31 and from the atmospheric connection orifice 33. Now, since the gases coming from the atmospheric connection orifice 33 have passed through the filter cartridge, they have been relieved of their hydrocarbon content. Because of this, the fuel content of the gases drained into the intake manifold of the engine is substantially reduced, thus reducing the disturbances which can be caused to the devices for regulating the richness of the fuel mixture.

A description will now be given, in conjunction with FIG. 2, of a variant of the device in FIG. 1. In the following description, the reference numbers repeated from FIG. 1 correspond to identical or similar parts.

Figure 2:
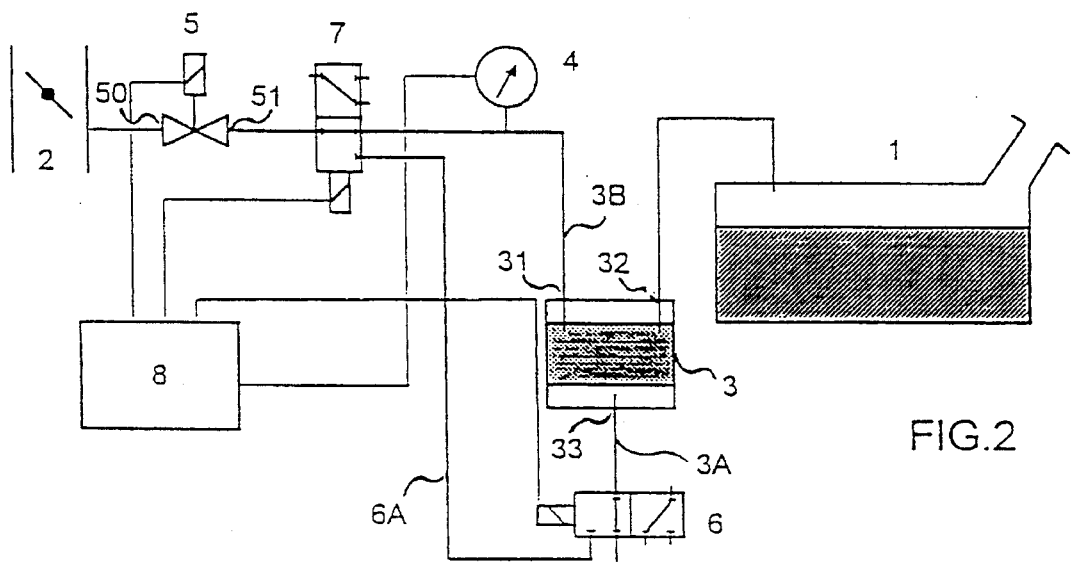
FIG. 2 represents a diagram of a variant of the device in FIG. 1.

FIG. 2 shows that the link between the duct 6A leaving the distributor 6 and the duct 3B connecting the purge orifice 31 of the cartridge to the orifice 51 of the purge solenoid valve 5 is now produced by a second three-way two-position pneumatic distributor 7. This distributor 7 connects, in the rest position, the orifice 51 of the purge solenoid valve 5 to the duct 3B coming from the purge orifice 31, while closing that end of the duct 6A which lies opposite the first distributor 6. In the working position, the distributor 7 connects the orifice 51 of the purge solenoid valve 5 to that end of the duct 6A which lies opposite the first distributor 6, while closing that end of the duct 3B which lies opposite the purge orifice 31 of the cartridge. The control solenoid of the distributor 7 is electrically connected to the computer 8.

In the initial state of the device, the solenoid valve 5 is closed and the distributors 6 and 7 are in their rest position. When a leaktightness test of the device is to be carried out, the computer 8 orders the distributor 6 to pass from the rest position to the working position, thus connecting the atmospheric connection orifice 33 of the cartridge, via the ducts 3A and 6A, to the distributor 7. The computer 8 simultaneously causes the distributor 7 to pass from the rest position to the working position, thus connecting the duct 6A to the orifice 51 of the solenoid valve 5 and closing the duct 3B. The computer 8 then causes the opening of the purge solenoid-valve 5, thus allowing the partial vacuum which prevails in the intake manifold 2 of the engine to propagate into the cartridge 3 and into the tank 1. It will be noted that the partial vacuum is set up in the device by means of the ducts 3A and 6A exclusively, ending in the atmospheric connection orifice 33, with the result that the gases drained to the intake manifold 2 of the engine are gases which are free of fuel vapors. This partial vacuum is then measured by the sensor 4 which informs the computer 8 of its value. When this value reaches or exceeds a predetermined value, the computer 8 closes the solenoid valve 5, thus isolating the whole of the device both from the partial-vacuum source and from the atmospheric pressure. The test procedure then continues as described above in conjunction with FIG. 1.

According to an advantageous feature of the present invention, the pressure sensor 4 is now connected to the duct 3B between the distributor 7 and the purge orifice 31. This arrangement has the advantage of allowing more reliable measurement of the pressure by eliminating pressure fluctuations which can be caused by movements of the fuel in the tank, these being particularly substantial when the tank is full. This arrangement has the further advantage of absorbing the partial vacuum measured by the sensor. In fact, with the duct 3B being closed by the distributor 7, the partial vacuum measured by the sensor is set up through the cartridge whole capacity and restriction imposed by the active charcoal layers behave as a low-pass filter.

Figure 3:
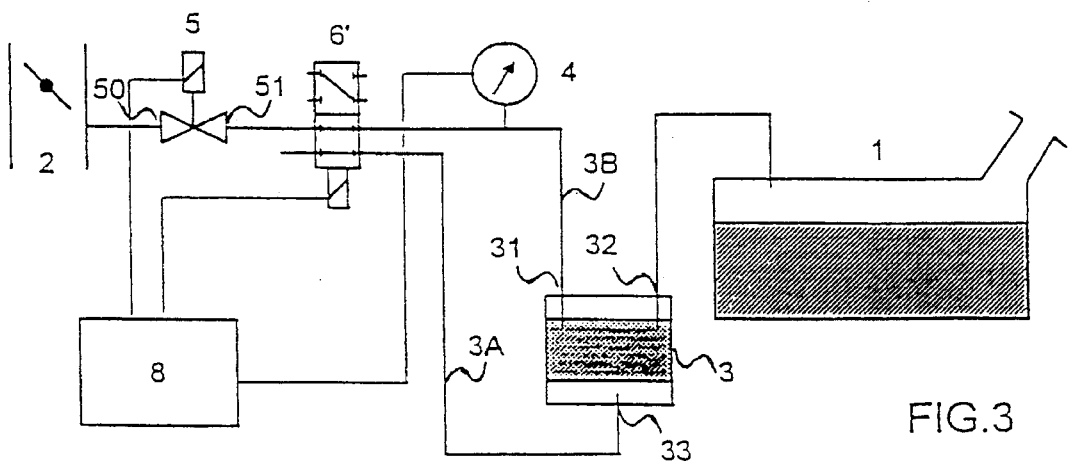
FIG. 3 represents a diagram of a second, preferred, embodiment of the device according to the invention.

According to a preferred embodiment of the invention which will now be described with reference to FIG. 3, the functions of the distributors 6 and 7 are combined in a four-way, two-position pneumatic distributor 6'. This four-way distributor 6' connects, in the rest position, that end of the duct 3B which lies opposite the purge orifice 31 of the cartridge with the orifice 51 of the purge solenoid valve 5 via two of its channels, on the one hand, and that end of the duct 3A which lies opposite the atmospheric connection orifice 33 of the cartridge with the atmosphere via its other two channels, on the other hand. In the working position, the distributor 6' connects that end of the duct 3A which lies opposite the atmospheric connection orifice 33 of the cartridge with the orifice 51 of the purge solenoid valve 5 and closes the other two channels, and more particularly that end of the duct 3B which lies opposite the purge orifice 31 of the cartridge. The control solenoid of the distributor 6' is electrically connected to the computer 8.

It is thus clear that, during a leaktightness test of the device, the computer 8 orders the distributor 6' to pass into the working position, then opens the solenoid valve 5. The partial vacuum of the intake manifold is then propagated into the device through the duct 3A connected to the atmospheric connection orifice 33 of the cartridge. As before, the gases drained to the intake manifold are then free of fuel vapors. With the duct 3B being closed by the distributor 6', the partial vacuum measured by the sensor 4 has the same advantageous features as those described in FIG. 2. On closure of the solenoid valve 5, ordered by the computer when the partial vacuum reaches a predetermined threshold, the whole of the device located between the solenoid valve 5 and the tank is under partial vacuum and isolated from the atmospheric pressure. Observing the pressure in the device then makes it possible to conclude the absence of leaks, in the conventional manner, if this pressure remains stable.

Such a device therefore makes it possible to achieve the objects of the invention, while requiring only a single distributor, and consequently only a single control output of the computer, which makes it particularly economical.

We claim:

1. A device for recovering vapors leaving a fuel tank of a motor vehicle, comprising:

a filter cartridge for recovering vapors from a fuel tank of a motor vehicle by absorbtion, said filter cartridge having a plurality of openings formed therein, said openings including a purge orifice, an inlet orifice communicating with a fuel tank of a motor vehicle, and an atmospheric connection orifice therein for discharging vapors to the atmosphere;

a control solenoid valve for purging said filter cartridge, said control solenoid valve having a first orifice communicating with an intake manifold of an internal combustion engine of the motor vehicle, and a second orifice communicating with said purge orifice of said filter cartridge through a purge duct connected therebetween;

connecting means for selectively connecting said atmospheric connection orifice of said filter cartridge to the atmosphere or to said second orifice of said purge solenoid valve for establishing a controlled partial vacuum in the device without interfering with a regulation of an air/fuel mixture supplied to the internal combustion engine.

2. The device according to claim 1, wherein said connecting means comprise a first three-way distributor.

3. The device according to claim 2, which further comprises a duct fluidically connected between said inlet orifice of said filter cartridge and the fuel tank, and a partial-vacuum sensor connected in said duct.

4. The device according to claim 2, which further comprises a second three-way distributor for selectively connecting said second orifice of the solenoid valve:

· with said purge orifice of said filter cartridge via said purge duct in a rest position, and with said atmospheric connection orifice via said first three-way distributor, while simultaneously closing said purge duct in a working position.

5. The device according to claim 1, which further comprises a three-way distributor for selectively connecting said second orifice of the solenoid valve:

with said purge orifice of said filter cartridge via said purge duct in a rest position, and with said atmospheric connection orifice via said connecting means, while simultaneously closing said purge duct in a working position.

6. The device according to claim 1, wherein said connecting means comprise a four-way distributor for selectively:

connecting said second orifice of said solenoid valve to said purge orifice of said filter cartridge and, simultaneously, connecting said atmospheric connection orifice to the atmosphere, in a rest position, and connecting said second orifice to said atmospheric connection orifice and, simultaneously, closing said purge duct, in a working position.

7. The device according to claim 4, which further comprises a partial-vacuum sensor connected in said purge duct connecting said filter cartridge to said second three-way distributor.

8. The device according to claim 5, which further comprises a partial-vacuum sensor connected in said purge duct connecting said filter cartridge to said three-way distributor.

9. The device according to claim 6, which further comprises a partial-vacuum sensor connected in said purge duct connecting said filter cartridge to said distributor.

* * * * *